← PUSH

Fig. 4.
PUSH →  Fig. 5.
Fig. 6.

United States Patent Office 3,229,826
Patented Jan. 18, 1966

3,229,826
CONVEYORS
Leo Benson Blacklock, Brian John Taylor, and Colin George Young, Peterborough, England, assignors to Baker Perkins Incorporated, Saginaw, Mich.
Filed May 31, 1963, Ser. No. 284,509
Claims priority, application Great Britain, June 5, 1962, 21,752/62
8 Claims. (Cl. 214—16.4)

This invention relates to conveying apparatus and more particularly but not exclusively, to conveying apparatus which may be incorporated in baking plant such as a bread dough prover, with which type of device, for ease of description, the following will be concerned.

In the conveying of dough through a prover, it is common to employ circuitous transit, effected by means of endless conveyor chains, and dough being placed in carriers, of various types, which are attached to the conveyor chains at a suitable pitch. Such chain circuits require chain wheels or radiused chain tracks at each turning point in the circuit, the radius of the wheels being necessarily large in relation to the size of carrier handled, since the clearance space between the carriers is unavoidably reduced at a radiused turning point and a minimum clearance must be maintained to prevent fouling. Thus, the minimum size of apparatus, is, inter alia, determined by the pitch of the carriers on the conveying chain which is, in turn, controlled by the proximity of the carriers to each other whilst travelling around the turning points.

For reasons of space economy, it may be necessary to reduce the clearance between carriers such that, if the carriers were allowed to swing on the conveyor chain there would be danger of fouling, especially at the turning points. The known remedy in such cases is to control and stabilize the carriers throughout the circuit which, however, calls for costly and accurate engineering.

There are also conveying systems in use where the carriers are not in engagement with the conveying chain throughout the entire circuit. Such systems however also have radiused turning points and are not comprised of multiple runs or flights, a complete circuit comprising only two tracks or only a single plain loop.

It is further known to have continuous trains of disconnected contacting carriers travelling in a continuous circuit on two superimposed horizontal tracks, horizontal movement of the carriers along the tracks and vertical transfer from one track to another being by means of sprockets at each end of said tracks. Such apparatus however is again restricted to only two tracks and, furthermore the carriages may become inverted in passing over the sprockets from one track to the other.

It is still further known to have continuous trains of disconnected contacting carriers on two tracks at different horizontal levels, movement of the carriers along the tracks being by pusher means and vertical transfer of the carriers from one track to the other being by lifting or lowering means at each end of said track.

Another system has continuous trains of disconnected contacting carriers travelling in a continuous circuit on two superimposed horizontal tracks, horizontal movement of the carriers being by pusher means and vertical transfer from one track to the other by lifting or lowering means at each end of said track. However, such apparatus suffers from the disadvantage, as do all the systems heretofore mentioned, that the length of time spent in the prover for individual articles is entirely dependent on their desired rate of feed and discharge.

An object of the present invention is to provide improved apparatus for conveying articles through an article treatment zone or article storage zone whereby the articles may be continually passed through the zone in a circuitous path, and whereby the length of time spent in the zone by the articles may be adjusted without affecting the rate of feed or discharge of articles The invention consists in conveying apparatus comprising a plurality of independent article carriers arranged to traverse a guide track circuit between a feed station and a delivery station along a path which includes a tortuous portion, a plurality of spaced parallel horizontal guide sections to form said tortuous or circuitous circuit parallel horizontal guide track sections to form said tortuous or circuitous circuit portion, said guide track sections including a first track section, a last track section, and an even number of intermediate track sections, elevator means for transferring carriers from one extremity, the end, of said last track section to one extremity, the beginning, of said first track section, de-elevator means for transferring carriers from the opposite extremity, the end, of said first track section progressively through intermediate track section to intermediate track section, to the other extremity, the beginning, of said last track section, carrier propelling means for moving the carriers along each track section, means at the station for transferring articles to the carriers, means at the delivery station for removing articles from the carriers, and means for rendering the carrier propelling means for moving carriers inoperative in respect of at least one of the track sections whereby at least said one track section and its immediately succeeding track section are isolated from the circuit so that the effective length of the circuit, and hence the time taken for one circuit of the carriers may be varied.

The invention further consists in an apparatus as has been described and comprising a plurality of spaced parallel horizontal fixed guide track sections, including a first track section, a last track section, and at least one pair of intermediate track sections, a plurality of identical article carriers for support in abutting relationship on each track section, so as to completely fill each section, the track sections being in length equal to a multiple of the length of a carrier a front end de-elevator carriage associated with one extremity of the fixed guide track sections a rear end de-elevator carriage associated with the other end of the guide track sections, both of said carriages including a number of parallel guide tracks equal to at least half the number of fixed guide track sections and being spaced apart at twice the spacing of the fixed guide track sections, an elevator carriage adjacent the said front end de-elevator carriages, and including a number of parallel guide tracks equal to at least half the number of fixed guide tracks and spaced apart at twice the spacing of the fixed guide track sections, additional carriers sufficient to make the total number of carriers equal to the total number of carrier lengths of both the fixed and elevator and de-elevator guide tracks, less a number equal to half the number of fixed guide tracks, carrier propelling means for moving the carriers along the fixed guide track sections, and onto and off the elevator and de-elevator guide tracks, means for reciprocating the de-elevator carriages and elevator carriages in a plane parallel to the plane of the adjacent ends of the fixed guide tracks, with a stroke equal to the spacing between the fixed guide track sections, and with a dwell period between each stroke to alternately form extensions on each end of one or other set of alternate fixed guide track sections, the movements of the front and de-elevator carriage being oppositely directed to the movements of the elevator carriage and the rear end de-elevator carriage, means for operating the carrier propelling means for moving the carriers along a set of alternate fixed guide track sections during the dwell periods in the movements of said carriages when said set is extended, to cause the individual carriers to be propelled around the entire circuit, and means for rendering at least the propelling means for moving the carriers along one fixed guide track section inoperative thereby to isolate at least said section and the immediately successive section from the circuit.

The invention still further consists in an apparatus as has been described and comprising a plurality of spaced parallel horizontal fixed guide track sections, including a first track section, a last track section and at least one pair of intermediate track sections, a plurality of identical article carriers for support in abutting relationship on each track section, so as to completely fill each section, the track sections being in length equal to a multiple of the length of a carrier, de-elevator means associated with each end of the fixed guide track sections and each comprising endless conveyor means, a run of which is operable in a plane parallel to the plane of the adjacent ends of the fixed guide track sections, said conveyor means having a plurality of carrier engagement means attached thereto and spaced apart at distances not greater than twice the distance between the fixed guide track sections, said engagement means being adapted to support and transfer carriers individually from one fixed guide track section to the next succeeding one, elevator means operable between the end of the last fixed guide track section and the beginning of the first fixed guide track section to transfer carrier from said end to said beginning, said elevator means comprising endless conveyor means, having a plurality of carrier engaging means attached thereto and adapted to receive carriers individually from said end, support and transfer same, and release the carriers to said beginning, carrier propelling means for moving carriers along each fixed guide track section, and onto and off the elevator and de-elevator means, at least as many additional article carriers as the number of fixed guide track sections, means for actuating the elevator conveyor means so that the operative van thereof moves in a direction from the end of said last guide track section towards the beginning of said first guide track section, means for actuating the de-elevator conveyor means so that the operative runs therefore move in a direction from said first track section towards said last section, means for actuating the carrier propelling means in timed relation to the movement of said conveyor means to move the carriers around the circuit, and means for rendering the carrier propelling means for moving carriers along at least one fixed guide track section inoperative, thereby to isolate at least said section and the immediately succeeding section from the circuit.

To show how the invention may be carried into effect, it will now be described by way of example with reference to the accompanying drawings in which:

FIGURE 4 is a view similar to FIGURE 3 but illustrating the apparatus at the next succeeding stage of its operation;

FIGURE 5 is a view similar to FIGURE 4 but illustrating the apparatus at the next succeeding stage of operation;

FIGURE 6 is a view similar to FIGURE 5 but illustrating the apparatus at the conclusion of one operative cycle of operation;

Figure 1:
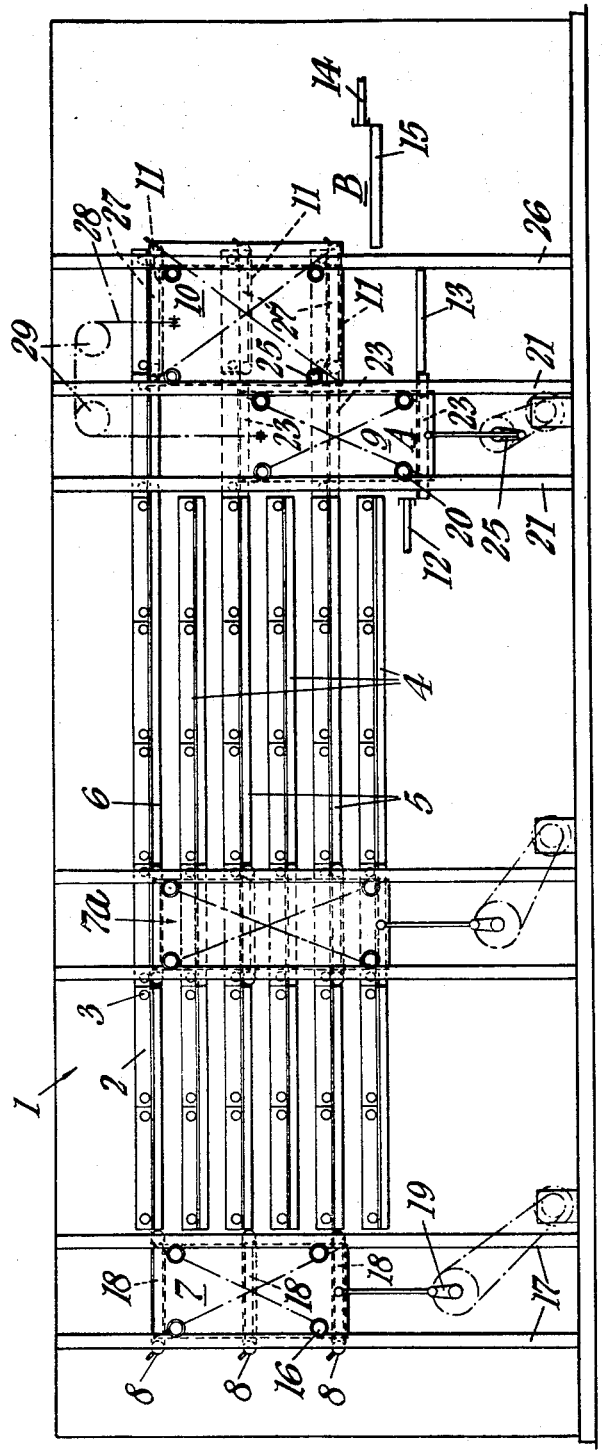
FIGURE 1 is a diagrammatic side elevation of one form of conveying apparatus according to the invention.
Figure 2:
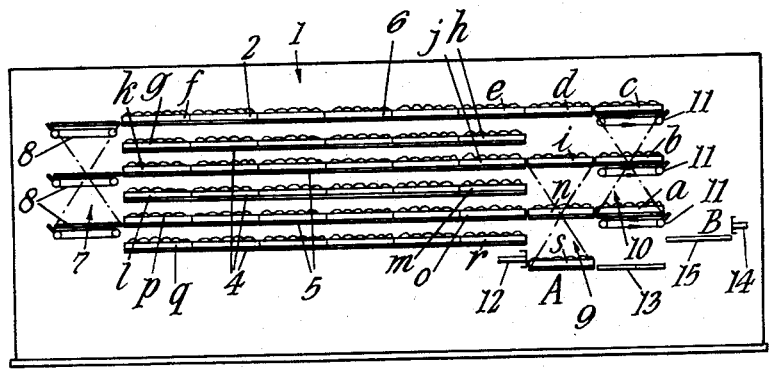
FIGURE 2 is a diagrammatic side elevation view of the apparatus shown in FIGURE 1 and illustrating the apparatus at one stage of its operation.
Figure 3:
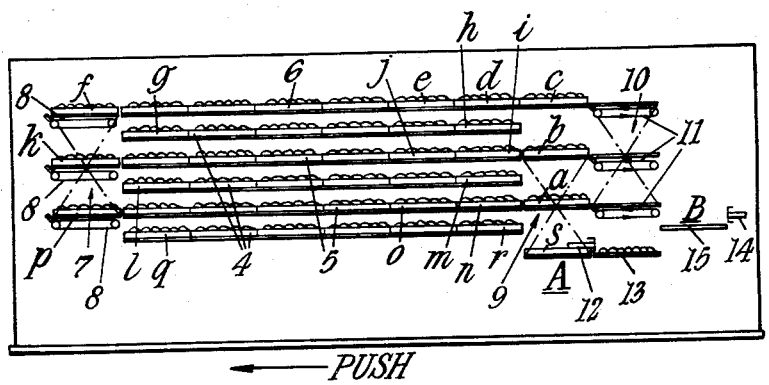
FIGURE 3 is a view similar to FIGURE 2 but illustrating the apparatus at the next stage of its operation.

Referring to FIGURE 1, the conveyor means comprises a main frame or casing 1 within which are provided a plurality of disconnected identical, contacting carriers 2 arranged in a plurality of equidistantly vertically spaced fixed guide tracks 4, 5 and 6 each formed by a pair of horizontally spaced runner rails on which the carriers move by means of rollers 3 attached thereto. Tracks 4 and 5 are of equal length equivalent to a multiple of the length of each individual carrier 2. The uppermost track 6 is extended at the front end of the apparatus (right hand side of FIGURE 1) the extension being equal to the length of one carrier.

It is understood, that whilst the embodiment illustrated comprises six vertically spaced horizontal tracks, any even number of tracks may be equally well employed.

At the rear end (left hand side of FIGURE 1) of tracks 4, 5 and 6 is situated de-elevator means in the form of a rear and de-elevator carriage 7, having guide rollers or shoes 16, mounted between vertical guide rails 17 which are supported from the main frame 1. Carriage 7 is provided with a plurality of pairs of runner rails 18 which form the de-elevator guide tracks, each equal in length to one carrier 2 and spaced at twice the pitch of tracks 4, 5 and 6, there being half as many pairs of rails 18 as vertical tracks.

Each of the rail pairs 18 is provided with a chain pusher 8 forming the propelling means and comprising an endless roller chain extending over the length of rails 18 and passing over end sprockets, each chain being provided with means for engaging carriers 2, and synchronised driving means.

It is possible that the action of the pushers on the carriers may result in "jack-knifing" or lifting of the carriers. This can be prevented, in the vertical plane, by overrunner rails or the like, suitably disposed above each of the tracks, such that the rollers are prevented from lifting off the tracks and, in the horizontal plane, by side rails or the like engaging with additional rollers having vertical axes, or sliding means, mounted on the carriers. In the latter instance these additional rollers may either supplement or supplant the flanges of the existing rollers.

A crank mechanism 19, with associated driving means is provided for raising and lowering lift carriages 7, the length of stroke of said crank mechanism being equal to the vertical spacing of tracks 4, 5 and 6, such that rails 18 can line up either with tracks 5 and 6 or with tracks 4.

At the front end (right hand side of FIGURE 1) of tracks 4 and 5, immediately below the extension of track 6, is a front end de-elevator means 9, having guide rollers or shoes 20, mounted between vertical guide rails 21 supported from the main frame 1. De-elevator carriage 9 is provided with three pairs of runner rails 23 in like manner to carriage 7. Crank mechanism 25, with associated driving means, provides means of raising and lowering carriage 9, the length of the stroke of said crank mechanism being equal to the vertical spacing of tracks 4, 5 and 6, such that rails 23 will line up either with tracks 4 or alternatively, such that the two upper rails 23 will align with tracks 5 and the lowermost rail 23 with a delivery conveyor 13, as will be described.

In front of the carriage 9 (i.e. to the right of carriage 9 on FIGURE 1) is situated an elevator means in the form of a carriage 10, having guide rollers or shoes 25, mounted between vertical guide rails 21 and 26 supported on main frame 1. Carriage 10 is provided with three runner rail pairs or tracks 27, in like manner to carriages 7 and 9, the carriage being suspended by a cable or chain 28 passing over pulleys 29 and connected at its remote end to carriage 9 such that when carriage 9 is in the lowered position, carriage 10 will be raised, rails pairs 27 lining up with tracks 5 and 6. When carriage 9 is in the raised position, carriage 10 will be lowered such that rail pairs 27 line up with tracks 4.

To each of the rail pairs 27 is provided a chain pusher 11 and driving means similar to the pushers 8 of carriage 7.

Beneath tracks 4, 5 and 6 and behind the carriage 9 is a delivery station A including a delivery pusher 12, having suitable means for pushing treated articles in a horizontal direction along a carrier situated on the lowest rails 23 when lift carriage 9 is in its lower position.

Delivery conveyor 13 is situated immediately beneath feed carriage 10 and in front of delivery carriage 9 such that it is in the same horizontal plane as the lowest rails 23 when delivery carriage 9 is in its lower position.

A feed conveyor 15 is positioned immediately to the front (i.e. to the right in FIGURE 1) of carriage 10 and in the same horizontal plane as the lowest runner rail track 4. A feed pusher 14 is situated to the back of feed conveyor 15, and has suitable means for pushing untreated articles from the feed conveyor in a horizontal direction onto a carrier positioned on the lowermost rail pair 27 of carriage 10 when this is in its lower position. The feed pusher and conveyor 15 constitute the feed station.

Microswitches, cam boxes or like actuating means are provided whereby the mechanical actuation of chain pushers 8 and 11, crank mechanisms 19 and 15, delivery pusher 12 and feed pusher 14 will follow the prescribed cycle whereby each carrier is caused to follow a circuitous path from the infeed station where it receives untreated goods to the delivery station where the now treated goods are removed, the carriers remaining at all times within the apparatus.

The method of operation of the apparatus is illustrated in FIGURES 2 to 6, which represent the sequence of stages forming an operating cycle, as will be described.

FIGURE 2

The apparatus is in a dwell position with all carriers 2 loaded with articles. The rear end carriage 7 is in the raised position with no carriers thereon, carriage 9 being in the lowered position and carriage 10 being consequently in the raised position. Both carriages 9 and 10 have a full complement of carriers.

FIGURE 3

Chain pushers 11 displace carriers $a$, $b$ and $c$ from right to left, by an amount equivalent to the length of one carrier, off feed light carriage 10. This causes corresponding displacement of all carriers on tracks 5 and 6 with consequent movement of carriers $f$, $k$ and $p$ onto the carriage 7. Simultaneously, delivery pusher 12 moves from left to right and delivers treated articles from the lowest carrier at the delivery station A onto delivery conveyor 13. Delivery pusher 12 then retracts from right to left to its original position.

FIGURE 4

Carriage 7 is lowered, carriage 9 is raised and carriage 10 is lowered such that the rails of all the carriage line up with the rails of tracks 4.

FIGURE 5

Chain pushers 8 displace carriers $f$, $k$ and $p$ from left to right, by an amount equivalent to the length of one carrier, off the back end lift carriage 7. This causes corresponding left to right movement of all carriares on tracks 4 with consequent displacement of carriers $h$, $m$ and $r$ onto carriage 9 while carriers $b$, $a$ and $s$ are displaced onto carriage 10. Feed pusher 14 then moves from right to left and feeds untreated articles from feed conveyor 15 onto the carrier $s$ which is now at the feed station B. Feed pusher 14 retracts from left to right to its original position.

FIGURE 6

Carriage 7 is raised, carriage 9 is lowered and carriage 10 is raised such that the rails on carriage 7 and carriage 10 line up with the rails of tracks 5 and 6 and the rails on carriage 9 line up with rails of tracks 5. The apparatus is now in the original dwell position of FIGURE 2, each carrier having progressed by one stop of its complete path.

The above operating cycle is repeated continuously such that each carrier is progressively moved around the circuit, the number of cycles being necassary for a particular carrier to complete a circuit being equal to the total number of carriers.

Figure 7:
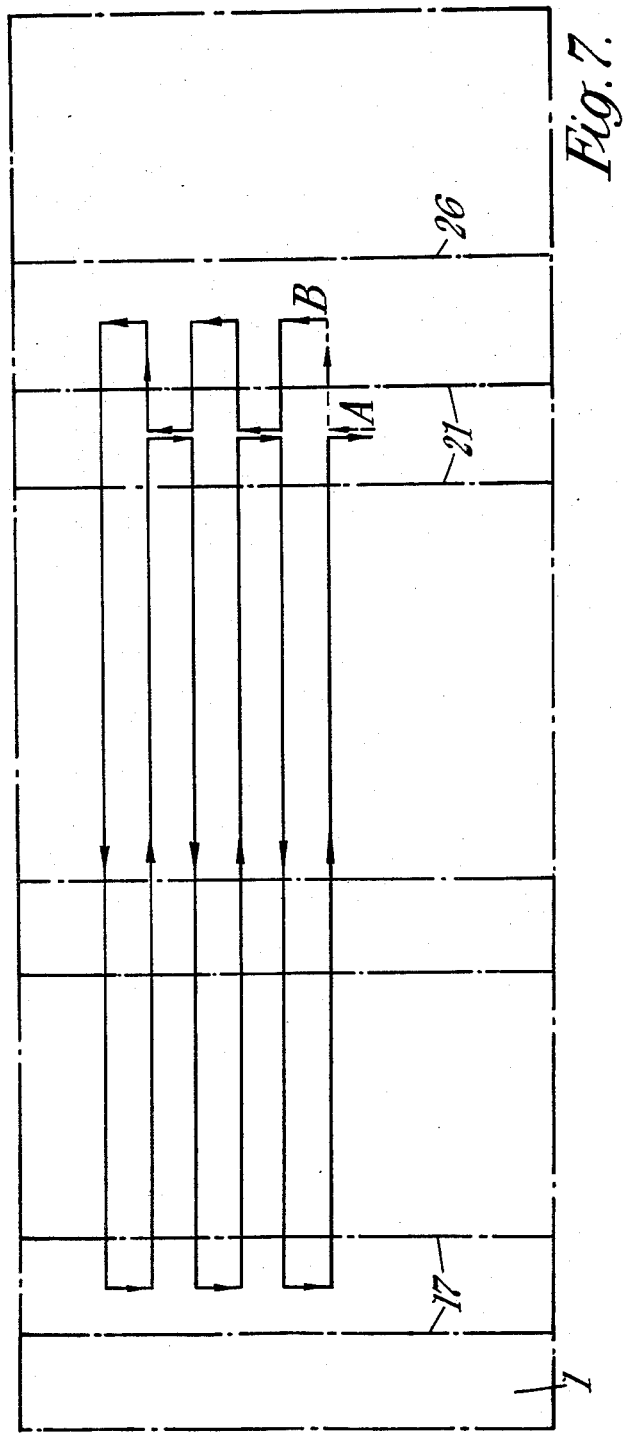
FIGURE 7 is a diagrammatic view of the apparatus of FIGURES 1 to 6 showing the path followed by article carriers through the apparatus.

FIGURE 7 illustrates the actual path followed by each of the carriers 2. Starting from the delivery station A where treated articles are delivered, the chain dotted line represents that of the circuit A to B during which the carriers are not loaded with articles. Thus is will be seen that, starting from station A, carriers are delivered to B, loaded with untreated articles and raised, alternately by carriage 9 and carriage 10 up to the top track 6. Thence they follow a tortuous path along tracks 6, 4 and 5, descending via carriages 7 and 9 and finally returning to station A where they are unloaded, the carriers themselves never leaving the closed circuit.

Means may be provided for reducing the length of the circuit, as may be required for different process conditions, by the positioning of one or more additional de-elevator carriages 7a (see FIGURE 1) between the back and front side of rail tracks 4, 5 and 6, said carriages 7a being of similar construction and having like means of raising and lowering as rear end carriage 7 but having additional equally vertically spaced rails, said additional rails not incorporating pushing means, such that when the full length circuit is required, carriages 7a form part of the tracks 4, 5 and 6 but if a shortened circuit is required an intermediate carriage may be energized and carriage 7 de-energized such that those portions of the tracks between carriages 7a and 7 are eliminated.

According to an alternative form of the invention, the operating cycle is reduced to horizontal and vertical movements, with no dwell period therebetween, discharging and feeding of goods occurring simultaneously with a horizontal movement, thereby achieving the maximum rate of circulation with the minimum velocity and acceleration.

Figure 8:
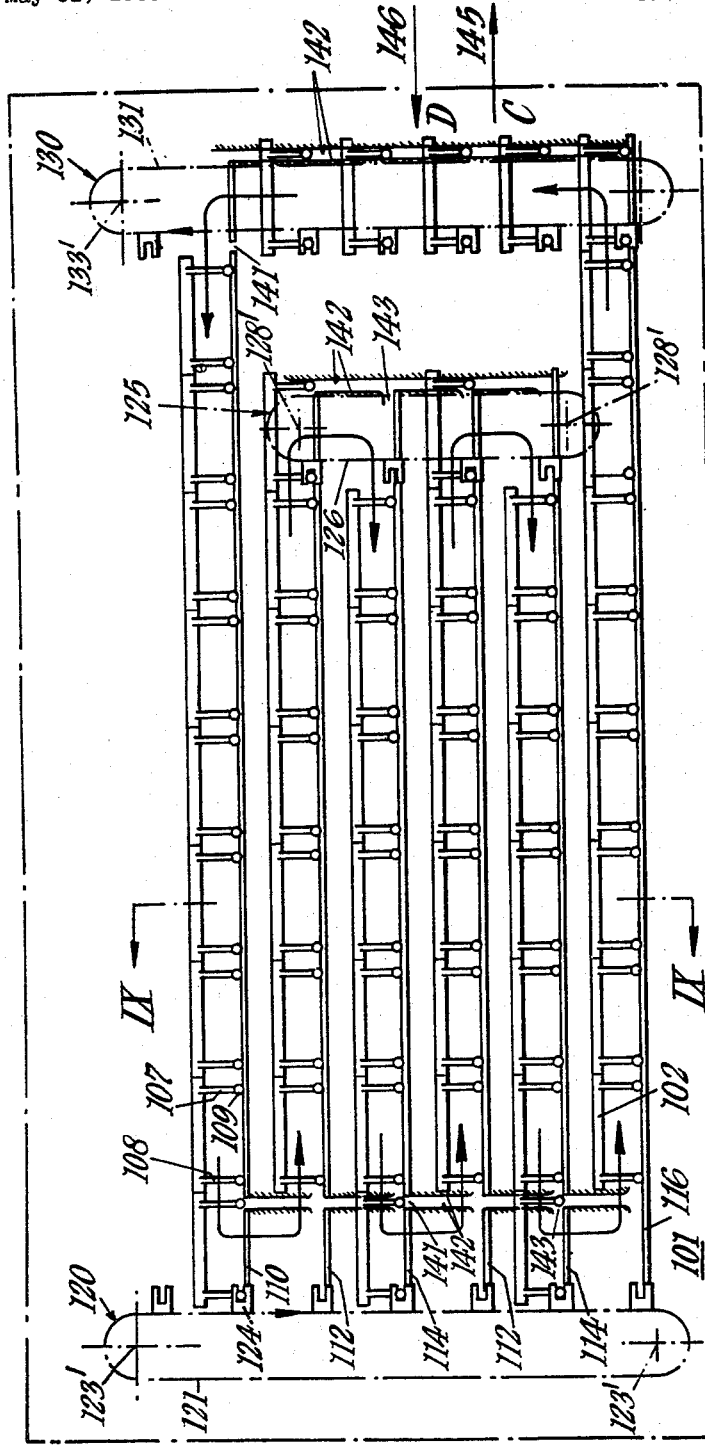
FIGURE 8 is a diagrammatic side elevation of an alternative form of conveying apparatus according to the invention.
Figure 11:
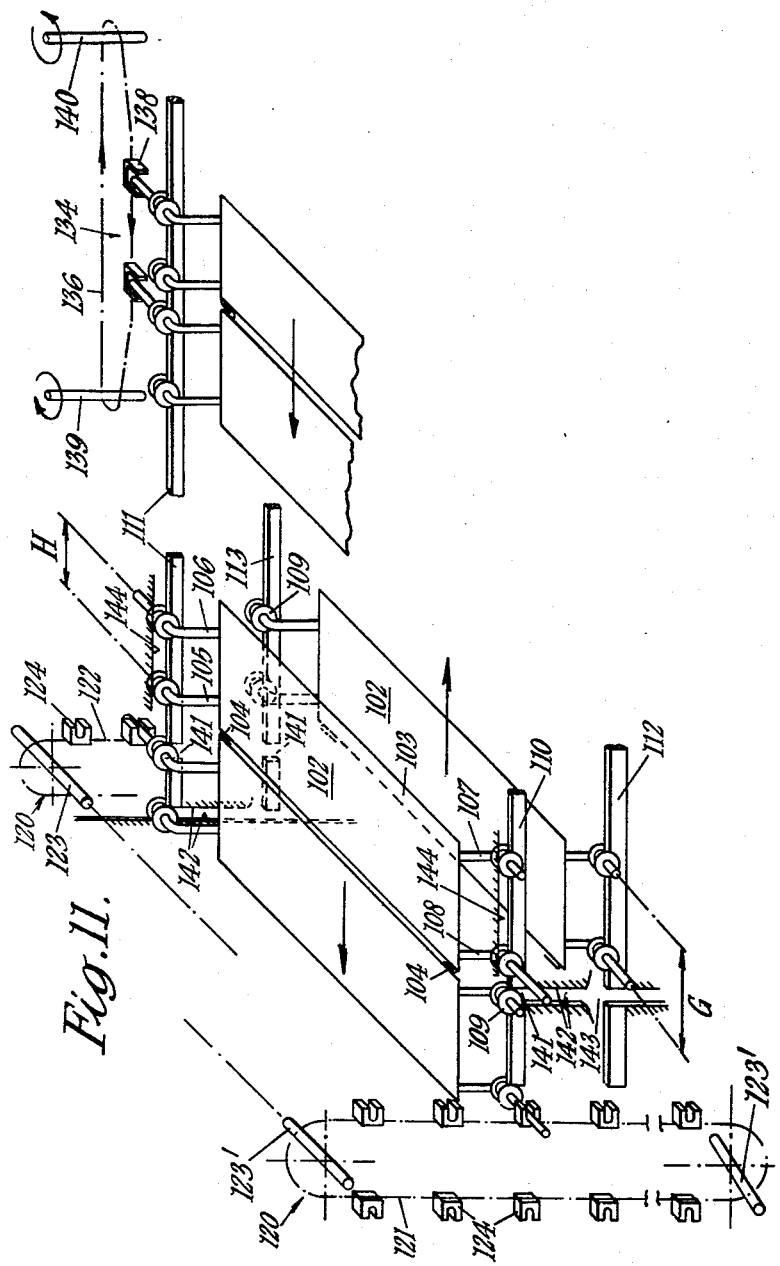
FIGURE 11 is a perspective view of part of the apparatus shown in FIGURES 8 to 10.

Referring to FIGURES 8 and 11, the apparatus comprises a main frame, or casing 101, within which is contained a plurality of continuous trains of disconnected carriers 102, each carrier being identical and comprising a base or tray 103, having vertically engaging and disengaging coupling means 104 (e.g. links of the "Sailor Grip" type) with two upwardly extending right angled arms mounted on the one side, viz, a stabilizer arm 105 and a conveyor arm 106 and two downwardly extending right angled arms on the opposite side, viz, a stabilizer arm 107 and a conveyor arm 108. The horizontal pitch H of arms 105 and 106 is less than the horizontal pitch C of arms 107 and 108, and the ends of arms 106 and 108 are extended. Each arm is equipped with flanged rollers, or like sliding means 109. The carriers are disposed in a plurality of equally spaced vertically aligned horizontal guide tracks each formed by a pair of offset runner rails adapted to be engaged by the carrier rollers 109.

Figure 9:
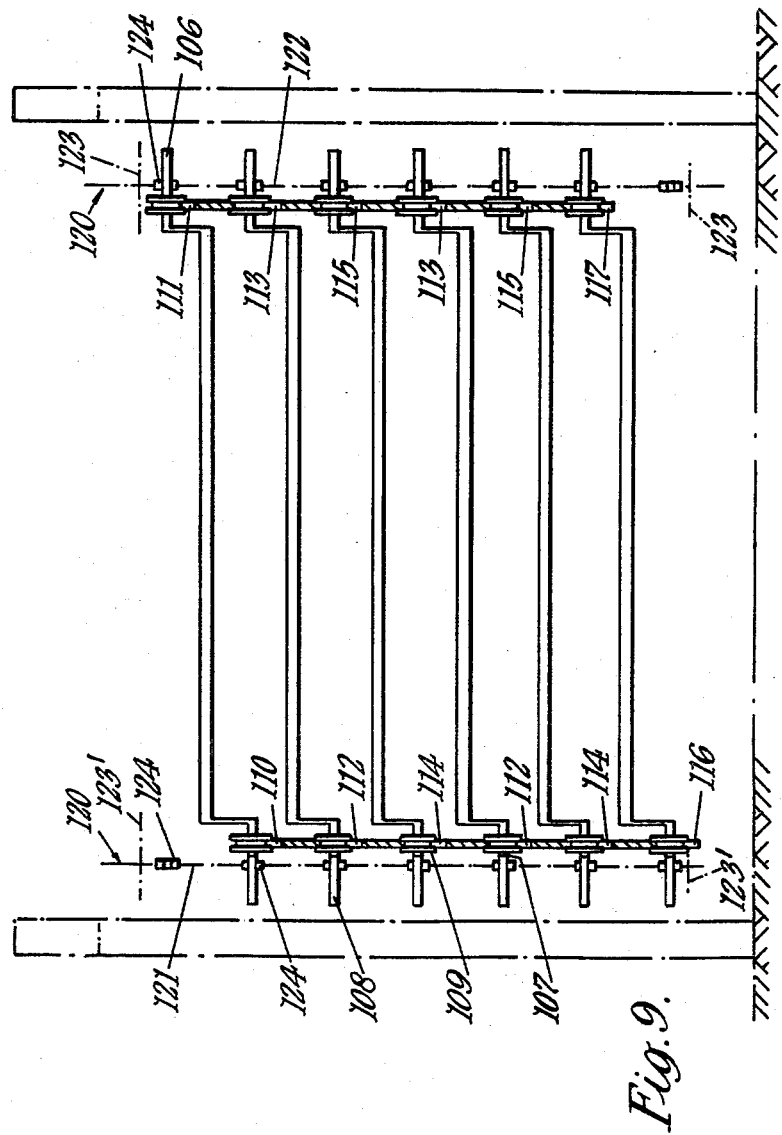
FIGURE 9 is a sectional elevation taken on line IX—IX of FIGURE 8.

Thus referring to FIGURE 9, rails 110 and 111 form the uppermost pair, 116 and 117, the lowest pair, and 112 and 113, and 114 and 115, the intermediate pairs. Rails 110, 112, 114, 116 are disposed in a vertical plane on one side of the apparatus and rails 111, 113, 115 and 117 are disposed in a parallel vertical plane on the opposite side such that each of rails 110, 112, 114 and 116 is one vertical tray pitch above its companion rail 111, 113, 115, 117, a vertical tray pitch being defined as the height between opposite side roller centres.

Rails 112, 113, 114, 115 are all of equal length, their length being a multiple of the length of one carrier, whilst rails 110, 111, 116, 117 are extended at the front end of the machine (left hand side of FIGURE 8) by an additional amount equal to the length of one or more carriers.

Gaps 141 are formed near the rear end of rails 110, 111, 112, 113, 114, 115 (right hand side of FIGURES 8 and 11) and are of slightly greater length than the diameter of rollers 109, these gaps being positioned such that when rollers 109 on arms 105 and 108 pass just vertically clear of the ends of the rails, rollers 109 on arms 106 and 107 may pass through the gaps. Similar gaps 141 are also formed near the front end of these rails.

Pairs of vertical guides 142 (shown shaded in FIGURES 8, 9 and 11) are suitably positioned at the rear end of the apparatus between rails 110, 112, 114, 116 and rails 111, 113, 115, 117 at the front end of the apparatus between rails 112, 113, 114, 115 and rails 110, 111, 116, 117, the guides being situated adjacents gaps 141 to provide stabilising means for the rollers 109 on arms 105 and 107 as they pass vertically between two pairs of rails, (as will be described) the lower ends of said guides terminating above the lower pair of rails at gaps 143, whose height is slightly greater than the diameter of rollers 109 such that the rollers may move along said rails and pass through gaps 143.

Additional stabilizing means in the form of horizontal over runners 114 are positioned immediately in front of the gaps 141 at the rear end of rails 110, 111, 112, 113, 114, 115 and immediately behind the gaps 141 at the front end of these rails, the height of said over runners above the rails being slightly greater than the diameter of rollers 109.

At the rear end of rails 110, 111, 112, 113, 114, 115 is situated de-elevator means 120 comprising two continuous roller chains 121 on the one side of the apparatus and two similar offset chains 122 on the opposite side, and having vertical rams and sprockets or the like operable to rotate the shafts 123 and 123' associated with said chains (see FIGURE 11).

At the front end of rails 112, 113, and situated between rails 110, 111 and 114, 115 is a de-elevator means 125, comprising two continuous roller chains, 126 on the one side of the apparatus and two similar offset chains 127 on the opposite side, and having vertical rams and sprockets or the like operable on shafts 128 and 128' associated with said chains.

At the front end of rails 110, 111, 114, 115 is situated elevator means 130 comprising two continuous roller chains 131 on the one side of the apparatus and two similar chains 132 on the opposite side, and having vertical runs between sprockets on shafts 133 and 133'.

A plurality of carrier bearing forks 124 are attached to each of chains 121, 122, 126, 127, 131, 132, the spacing of the forks being equal to the vertical pitch of rails 110, 111, 112, 113, 114, 115.

The chains of each pair 121 and 122, 126 and 127, 131 and 132 are offset horizontally such that forks 124 on each chain pair may simultaneously engage with the extended ends of arms 106 and 108 of the carriers.

Synchronised driving means are provided for shafts 123 and 123', 128 and 128', 133 and 133'.

In front of the elevator means 130 are goods unloading means 145 at delivery station C and goods loading means 146 at feed station D, the position of C being beneath the position of D and both C and D being at any convenient height level to correspond with carrier bases 103 of carriers 102 positioned on any of the rails 112, 113 or 114, 115.

Figure 10:
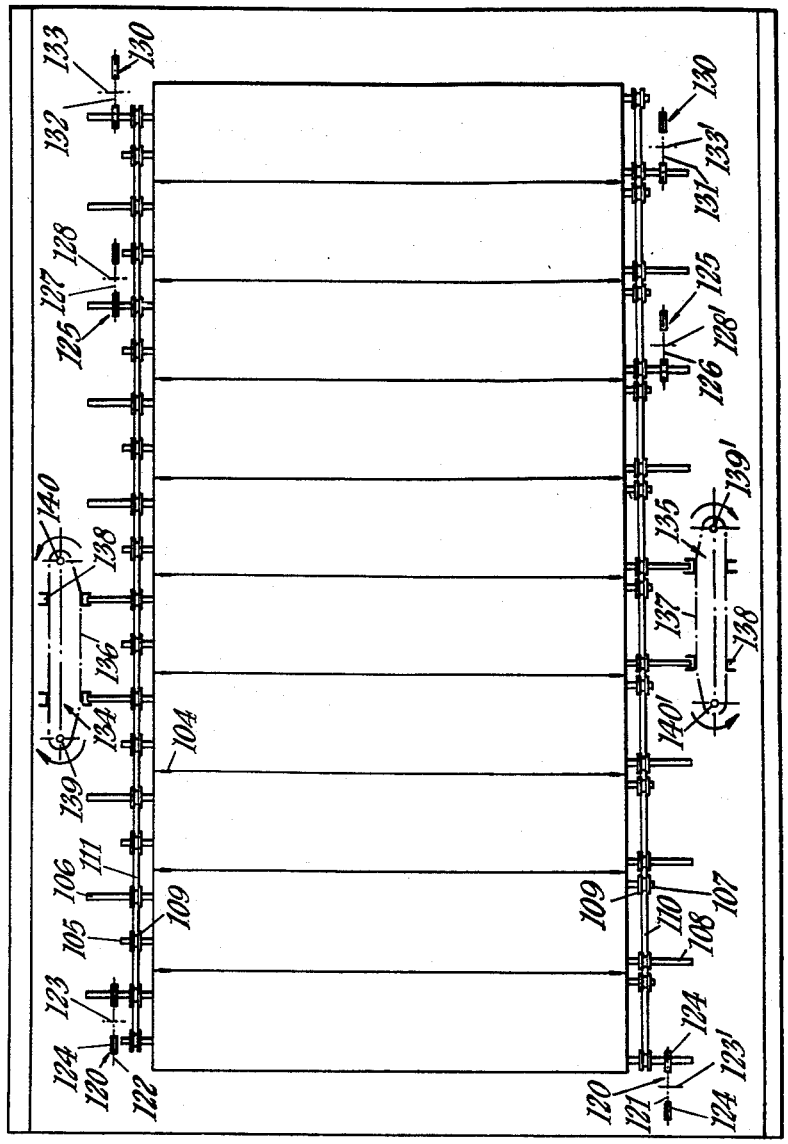
FIGURE 10 is a diagrammatic plan view of the apparatus shown in FIGURES 8 and 9.

Referring to FIGURES 10 and 11, adjacent the outer surface of each of the rails 110, 111, 112, 113, 114 and 115 are situated carrier propelling means formed by horizontal movers 134 and 135, each comprising a horizontal endless roller chain 136 or 137 and having rams or like actuating means parallel to the rails. Attached to said chains are forks 138, spaced along the chains at pitches equal to the length of one carrier 102 and adapted to engage with the carrier conveyor arms 105 and 107. Chains 136 pass around sprockets on line shafts 139 and 140, and chains 137 pass around sprockets on line shafts 139' and 140' the chains being suitably guided towards and away from the rails to give smooth engagement and disengagement on forks 138 with arms 105 and 107 of the carriers.

Line shafts 139, 139' and 140, 140' have synchronised clockwise and anti-clockwise driving means respectively, suitably sprocket engaging and disengaging means (e.g. clutches or splines) being provided such that movers 134 and 135 associated with rails 110 and 111, operate from front to back i.e. right to left on FIGURE 10, movers 134 and 135 associated with rails 116 and 117 operate from back to front, i.e. left to right on FIGURE 10, and movers 134 and 135 associated with rails 112 and 113, and 114 and 115 may operate either from front to back or back to front as required.

Actuation means such as micro-switches or cam boxes for example, are provided whereby the mechanical actuation of de-elevator means 120 and 125, elevator means 130, horizontal movers 134 and 135 and goods discharging and feeding means 145 and 146 will follow the desired sequence of operation as will be described.

Figure 13:
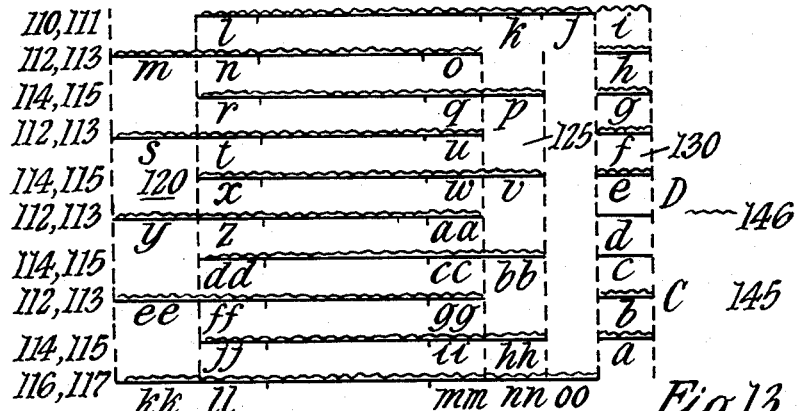
FIGURE 13 is a diagrammatic side elevational view of the apparatus shown in FIGURE 8 and illustrating the apparatus at one stage of its operation.
Figure 14:
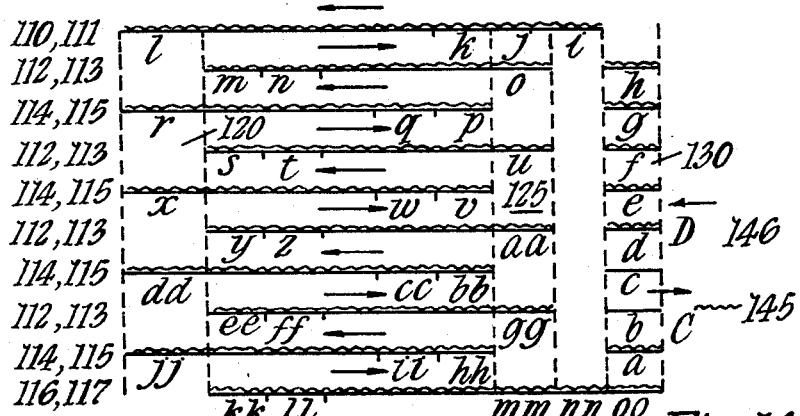
FIGURE 14 is a view similar to FIGURE 13 and illustrating the apparatus at the next stage of its operation.
Figure 15:
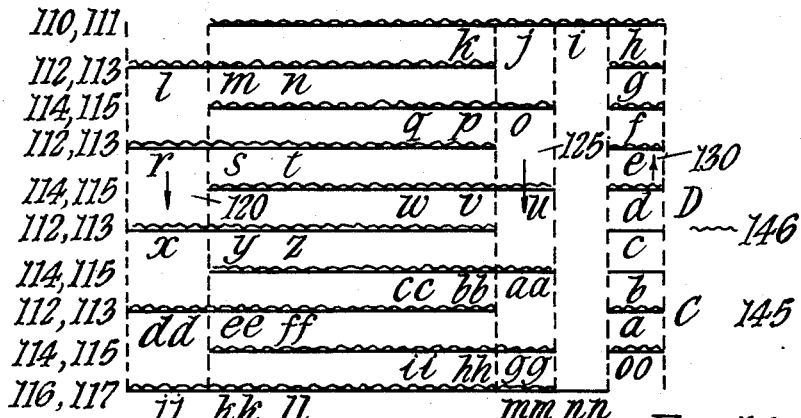
FIGURE 15 is a view similar to FIGURE 13 and illustrating the apparatus at the conclusion of one operative cycle of operation.

The method of operation is illustrated in FIGURES 13 to 15 which represent the sequence of the operations required to effect one forward displacement of all the carriers in a full circuit, a complete cycle (i.e. the moving of a carrier from position B say, around the circuit and returning it to position B) requiring a number of such sequences, equal to the number of carriers in a complete circuit.

FIGURE 13

The apparatus is shown with all carriers loaded with goods, excepting carriers c and d on elevator means 130 above station C and up to, and including, station D. Elevator means 130 supports carriers a to i in all positions level with rails 110, 111 and 112, 113, 114, 115, de-elevator means 120 supports carriers m, s, y, ee and kk in all positions level with rails 112, 113 and 116, 117 and de-elevator means 125 supports carriers p, y, bb and hh in all positions level with rails 114, 115.

FIGURE 14

Discharging means 145 discharges goods from carrier b at station C and feeding means 146 feeds goods onto carrier d at station D such that all carriers are loaded with goods, excepting carriers b and c.

The horizontal movers 134 and 135 move the carriers on rails 110 and 111, and 114 and 115 from front to back (i.e. right to left in FIGURE 14) and on rails 112 and 113, and 116 and 117 from back to front (i.e. left to right on FIGURE 14), said movement being equal to the length of one carrier in each case, such that elevator means 130 releases carrier *i* to rails 110 and 111 and receives carrier *oo* from rails 116 and 117, elevator means 125 releases carriers *p, v, bb* and *hh* to rails 114 and 115 and receives carriers *c, u, aa* and *gg* from rails 112 and 113 and de-elevator means 120 releases carriers *m, s, y, ee* and *kk* to rails 112 and 113, and 116 and 117, and receives carriers *e, v, x, ee* and *jj* from rails 110 and 111, and 114 and 115.

FIGURE 15

Carriers on de-elevator means 120 and 125 are lowered by an amount equal to the vertical pitch of the rails and the carriers on elevator means 130 are rised by an equal amount such that the configuration is now similar to that of FIGURE 6*a*, and the apparatus is ready to commence the next sequence.

Figure 16:
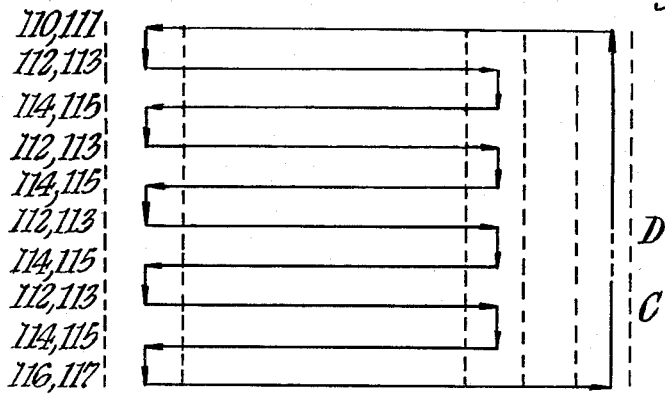
FIGURE 16 is a diagrammatic view of the apparatus of FIGURES 8 to 15 showing the path followed by article carriers in traversing a complete circuit of the apparatus and FIGURE 17 is a diagrammatic view of the apparatus of FIGURES 8 to 15 showing the path followed by article carriers in traversing a shortened circuit of the apparatus.

FIGURE 16 shows the actual path followed by the carriers around the circuit. Starting from delivery station C the chain dotted line represents that part of the circuit from C to D, during which the carriers are empty. The carriers after receiving goods at feed station D are raised by elevator means 130 to the top runner rails 110 and 111 whence they follow a tortuous path along rails 110 and 111, 112 and 113, 114 and 115, and 116 and 117, descending between said rails by de-elevator means 120 and 125, and finally being returned to position C by elevator means 130.

Figure 17:
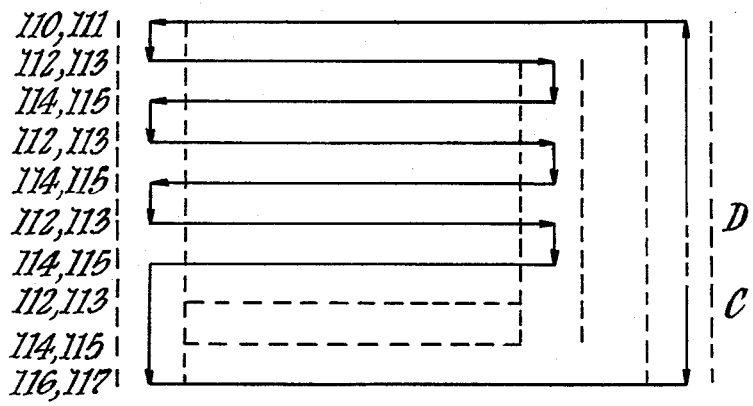

The tortuous path may be shortened, by any desired amount equivalent to a multiple of the length of two rail pairs 112, 113 and 114, 115. To this end, for example, before commencing operation, and with the apparatus initially in the configuration of FIGURE 14 but with all carriers empty, horizontal movers 134 and 135 associated with any selected pair of rails 114 and 115 are reversed such that the carriers on said rails are moved from front to back (i.e. right to left on FIGURE 14) by a distance equal to the length of one carrier, thus transferring an extra carrier to de-elevator 120 and said movers 134 and 135 associated with rail pair 112 and 113, immediately above said rails 114, 115 are then declutched from shafts 139, 140 and 139′,140′. This has the effect of isolating two rail pairs from the circuit and the carrier path followed is shown in FIGURE 17. Similarly by reversing the movers associated with more than one rail pair 114 and 115 and then declutching the relevant movers multiples of two rail pairs may be isolated from the circuit.

Figure 12:
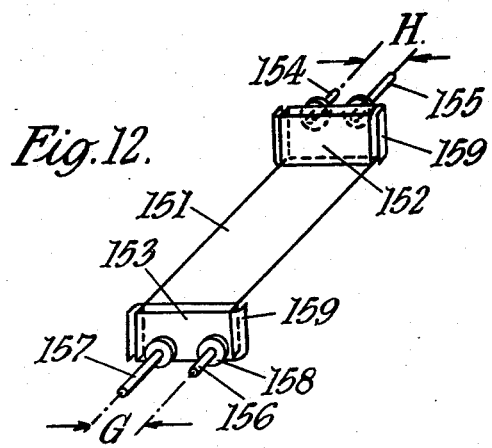
FIGURE 12 is an alternative form of article carrier for use in the apparatus of FIGURES 8 to 11.

An alternative form of carrier may be employed and is shown in FIGURE 12. It comprises a base, or tray, 151 having a vertically upward mounted sideplate 152 on one side and a vertically downward dependent side plate 153 mounted on the opposite side plates 152 ond 153 each being of equal height, the sum of said heights being at least as great as the vertical pitch between rails of a rail pair. Mounted on the side plate 152 is a horizontal stabiliser arm 154 and a horizontal conveyor arm 155, and mounted on side plate 153 is a horizontal stabiliser arm 156 and a horizontal conveyor arm 157, the horizontal pitch H of arms 154 and 155 being less than the horizontal pitch G of arms 156 and 157, each arm being equipped with flanged rollers or like sliding means 158, for engaging on the rails. Vertically engaging and disengaging coupling means 159 of the "Sailor Grip" type extend along the full vertical height of the back and front edges of sideplates 152 and 153, said extended coupling means also acting as alternative stabilising means, in place of the vertical guides 142, when carriers 2 pass vertically between rail pairs.

Alternatively, the carriers 102 which in the previous embodiments comprise a single platform or baseplate 103, or 151, may be provided with additional carrying members thus requiring modification to the discharging and feeding means 145 and 146.

In place of carrier horizontal movers 134 and 135 may be substituted carrier pushing or pulling means, suitably positioned at the ends of the rails and actuated for example, by synchronised mechanical means, e.g. crank mechanisms, pneumatic or hydraulic cylinders or the like. In the case of pushing means, the carrier coupling means can be eliminated.

It should be noted that in any of the embodiments heretofore enumerated, it is possible for the apparatus to be operated in the opposite direction to that described, by reversing the relevant mechanisms. In these cases the functions of the feed and delivery stations a well as the elevator and de-elevator means are transposed.

Furthermore, in the embodiments described, the horizontal guide tracks have been aligned in a vertical plane. According to the alternative forms, however, the tracks may be aligned in an inclined or horizontal plane in which latter case the tracks are positioned in side-by-side relationship and transfer is effected by horizontally moving elevator and de-elevator means. These alternative forms may furthermore include any of the embodiments or modifications heretofore described for the vertically aligned forms.

What is claimed is:

1. A conveying system for carriers comprising a plurality of vertically spaced apart, substantially parallel track sections having opposite terminal ends; means for introducing carriers to one terminal end of one vertically terminal track section; elevator means at the other terminal end of said one vertically terminal track section and associated with each intermediate track section between said vertically terminal track sections for transferring carriers in a closed circuit progressively from said one vertically terminal track section through each intermediate track section to the other vertically terminal track section; propelling means at each track section operable for moving carriers along said track sections; at least one intermediate elevator means having a number of vertically spaced apart guide tracks spaced apart a distance corresponding to the spacing between said track sections; means mounting said intermediate elevator means between the terminal ends of selected ones of said track sections for vertical reciprocation; selectively operable or inoperable means for reciprocating said intermediate elevator means in timed relation to the operation of said propelling means, or for maintaining said intermediate elevator means fixed with its guide tracks in alignment with said track sections; and means for selectively rendering inoperative the propelling means associated with selected ones of said intermediate track sections for isolating them from said circuit, whereby the effective length of said circuit may be varied.

2. The construction set forth in claim 1 wherein said intermediate track sections are even in number.

3. The construction set forth in claim 1 wherein the vertical spacing between adjacent track sections is uniform.

4. The construction set forth in claim 3 wherein said elevator means includes a plurality of vertically spaced track sections spaced apart a distance twice the spacing between said adjacent track sections.

5. The construction set forth in claim 1 wherein said elevator means comprises a carriage vertically reciprocable adjacent the associated terminal ends of said track sections, and including means for reciprocating said carriage in timed relation to the operation of said propelling means.

6. The construction set forth in claim 1 wherein said intermediate elevator means is mounted between the terminal ends of said intermediate track sections.

7. The construction set forth in claim 1 wherein said propelling means comprises endless chain pusher means having carrier engaging means associated therewith.

8. A conveying system for carriers comprising a plurality of uniformly and vertically spaced apart track sections each having two terminal ends; vertically reciprocable first carriage means mounted adjacent corresponding terminal ends of said track sections; vertically reciprocable second carriage means mounted adjacent the opposite terminal ends of said track sections; vertically spaced carrier support means on said first carriage means and on said second carriage means spaced apart a distance corresponding to twice the vertical spacing between adjacent track sections; propelling means associated with each of said support means and supported by each of said carriage means and operable to move carriers from the respective support means to said track sections; means for reciprocating said first and second carriage means in timed relation to the operation of the respective propelling means for transferring carriers in a circuitous path from one of said track sections successively to each of the others of said track sections; and means for selectively rendering inoperative the propelling means associated with the terminal ends of a selected track section for removing said selected track section from said path.

References Cited by the Examiner
UNITED STATES PATENTS

| | | |
|---|---|---|
| 1,577,589 | 5/1926 | Rapp. |
| 1,969,994 | 8/1934 | Stevenson _____ 214—8.5 |
| 2,095,151 | 10/1937 | O'Connor. |
| 2,631,383 | 3/1953 | Bettini _____ 214—16.4 X |
| 2,711,616 | 6/1955 | Weller. |
| 3,032,212 | 5/1962 | Gaskin. |
| 3,101,143 | 8/1963 | Valentyne _____ 214—16.4 X |

GERALD M. FORLENZA, *Primary Examiner.*

MORRIS TEMIN, HUGO O. SCHULZ, *Examiners.*